Aug. 11, 1936.  W. G. SHIPMAN  2,050,468
TOW BAR
Filed April 15, 1935  2 Sheets-Sheet 2
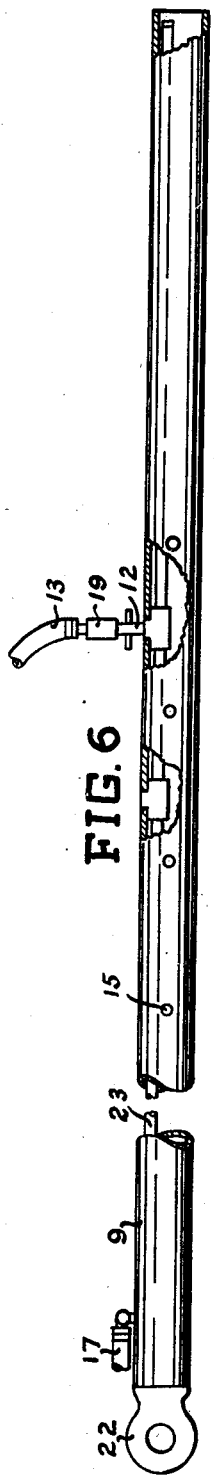
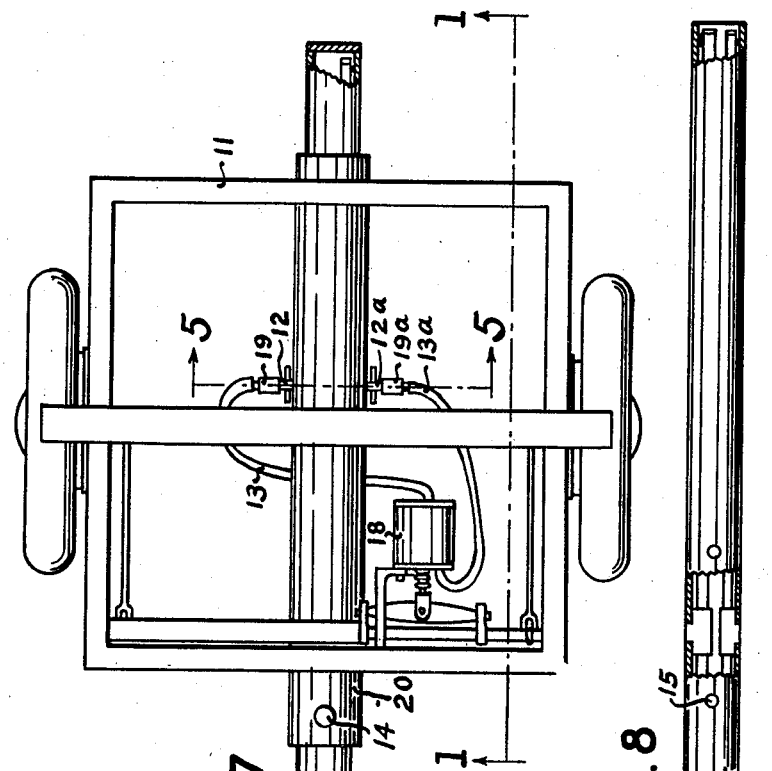
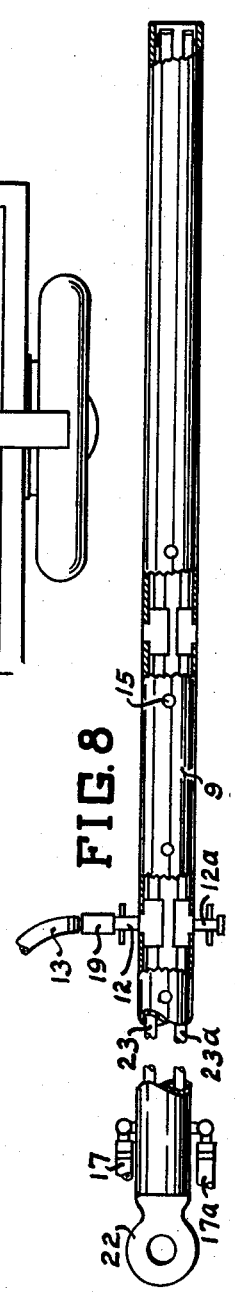
INVENTOR.
Walter G. Shipman
BY Van Buren Hillyard
ATTORNEY.

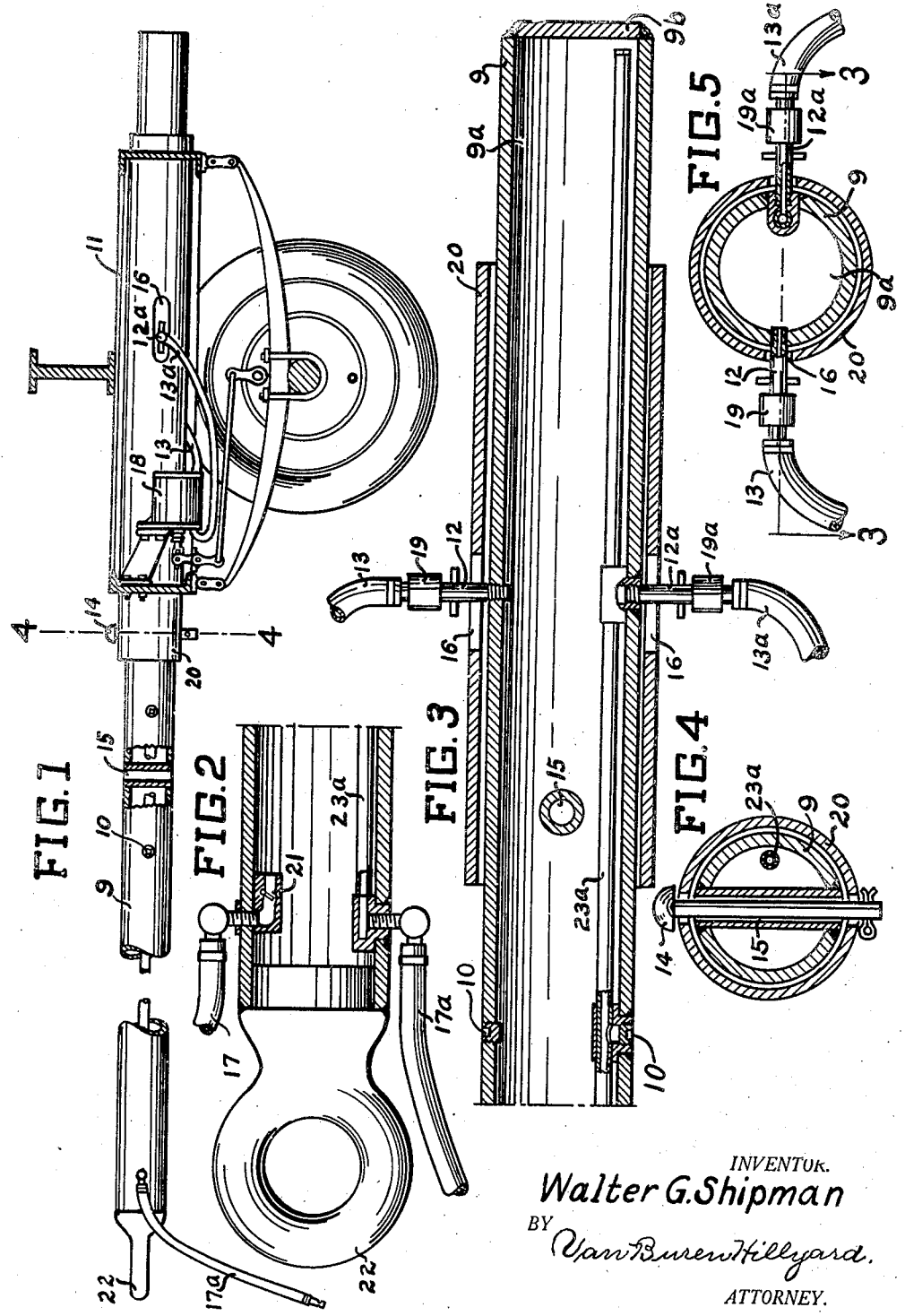

Patented Aug. 11, 1936

2,050,468

UNITED STATES PATENT OFFICE 2,050,468

TOW BAR

Walter G. Shipman, Iowa Park, Tex., assignor of one-half to John B. Barbour Trucking Company, Inc., Iowa Park, Tex., a corporation of Texas Application April 15, 1935, Serial No. 16,491

2 Claims. (Cl. 280—33.44)

The invention provides a hollow bar and equipment of novel and peculiar formation, adapted to connect a trailer to a tractor and, at the same time function either as an air line conduit or as a holder for a brake actuating medium such as generally employed in brake systems.

Trailers are generally equipped with brake mechanism adapted to be actuated by vacuum or air pressure supplied thereto from the tractor by hose connection. This has been found objectionable because the hose connection is exposed and subject to wear and requires frequent replacement.

The present invention obviates long exposed hose connection between the tractor and trailer and provides a coupling which serves either as a housing or a holder, or both.

While the drawings illustrate a preferred embodiment of the invention, it is to be understood that in adapting the same to meet specific needs and requirements, the design may be varied and changes in the minor details of construction resorted to within the scope of the invention as claimed, without departing from the spirit thereof.

For a full understanding of the invention and the merits thereof, reference is to be had to the following description and the drawings hereto attached, in which:

Figure 1 is a detail section on the line 1—1 of Figure 7, parts broken away.

Figure 2 is an enlarged view of the outer end of the pole, partly in section.

Figure 3 is a horizontal section on the line 3—3 of Figure 5.

Figure 4 is an enlarged transverse section on the line 4—4 of Figure 1.

Figure 5 is an enlarged cross section on the line 5—5 of Figure 7.

Figure 6 is a plan view, parts being broken away.

Figure 7 is a top plan view of a trailer and tow bar embodying the invention, parts being broken away.

Figure 8 is a view similar to Figure 6, showing two pipes within the tow bar.

Corresponding and like parts are referred to in the following description and designated in the several views of the drawings by like reference characters.

The numeral 11 designates a trailer of conventional type, provided with brake mechanism of any approved design and adapted to be automatically operated by vacuum or air pressure in a manner well understood. A sleeve 20 is applied to the frame of the trailer and receives a bar, pole or coupling 9 which connects the trailer with the tractor.

In accordance with the invention, the tow bar 9 is hollow and closed at its ends. The enclosed space forms a chamber 9a which holds air under pressure, or from which air is exhausted to create a vacuum, according to the nature of the brakes with which the trailer is equipped. A pin 14 passes through registering openings formed in the sleeve 20 and bar 9 to connect the bar with the trailer. A plurality of openings are provided in the length of the bar 9 to admit of its adjustment when coupled to the trailer. Short tubes 15 connect opposite openings and are welded or otherwise secured to the bar 9 to preserve a tight joint and prevent loss of pressure from the chamber 9a when air is stored therein or exhausted therefrom. Removable plugs 10 close certain of the openings and admit of hose connections 13, 13a, 17 and 17a being adjustably coupled to the bar 9 in desired position. The plugs 10 do not project to interfere with the free movement of the bar 9 when sliding it in the sleeve 20.

The hose connections 13 and 13a are coupled to the bar 9 by fittings 12—19 and 12a—19a, slots 16 being provided in the sides of the sleeve 20 to receive the respective fittings. When the chamber 9a is used as storage for a vacuum or air pressure, the connections connect directly with the chamber 9a as indicated in Figures 2 and 3. When the tow bar 9 is used as a conduit to house one or more pipes 23 and 23a for conveying vacuum or air pressure from the tractor to the brake mechanism of the trailer, the several hose connections are connected directly thereto, as shown in Figures 2, 3, 6 and 8. Figures 6 and 7 show a one pipe arrangement. Figure 8 indicates a two pipe system. Figure 2 shows a check valve 21 to retain pressure or vacuum in the chamber 9a when the hose connection 17 breaks loose or otherwise becomes incapacitated.

The invention obviates the usual long hose lines between a tractor and trailer which have proven objectionable because of the wear and injury thereto and resulting hazard necessitating frequent replacement.

The numeral 18 designates a conventional brake mechanism on the trailer which may be of the single or double acting type. When the brake cylinder is of the double acting type, both hose 13 and 13a connect outlets of the bar 9 therewith, as shown most clearly in Figures 3, 5 and 8. When the bar 9 is used for storage of pressure, or vacuum, it is essential that it be air tight, but when used as a housing for the pipes 23 and 23a, it may be open or closed, as indicated in Figures 6, 7 and 8. Figure 3 shows the brake operating medium taken both from the chamber 9a and the enclosed pipe 23a. When the brake cylinder is of the single acting variety only one hose 13 is required to take pressure direct from the bar 9 or pipe 23 therein, as appears in Figure 6.

Having thus described the invention, what I claim is:

1. As a new article of manufacture, an air tight hollow tow bar for coupling a trailer to a tractor, the tow bar having a plurality of outlets in its length for selective coupling thereto of hose connections, short tubes within the bar connecting certain openings and jointed thereto to maintain pressure and adapted to selectively receive a coupling pin, and plugs removably fitted to other openings to admit of selectively coupling hose connections to the bar.

2. The combination with a trailer provided with brake mechanism, and a coupling sleeve thereon having slots and registering openings in opposite sides, of an air-tight hollow tow bar adjustable in said sleeve and provided in its length with corresponding openings adapted to register with the slots of the coupling sleeve, transverse tubes within the tow bar having an air-tight connection with the sides thereof, a coupling pin selectively engaging one of said tubes and the registering openings of the coupling sleeve to secure the bar in desired adjusted position, removable plugs closing the openings in the sides of the bar, hose connections between the brake mechanism and bar, and fittings selectively coupling said hose connections to the bar and passing through the slots of the coupling sleeve.

WALTER G. SHIPMAN.